S. DYER.
AUTOMATIC DRINKING FOUNTAIN.
APPLICATION FILED MAY 22, 1914.
1,131,046.
Patented Mar. 9, 1915.
2 SHEETS—SHEET 1.
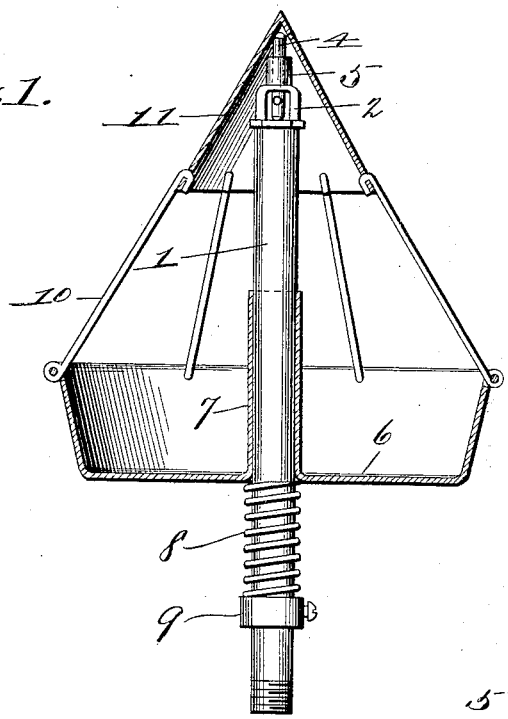
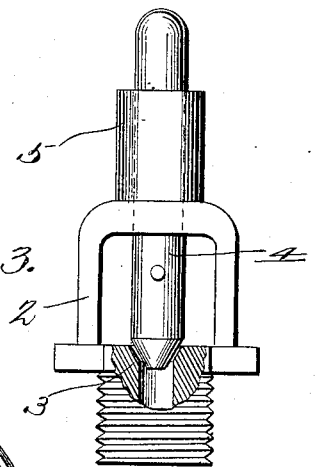
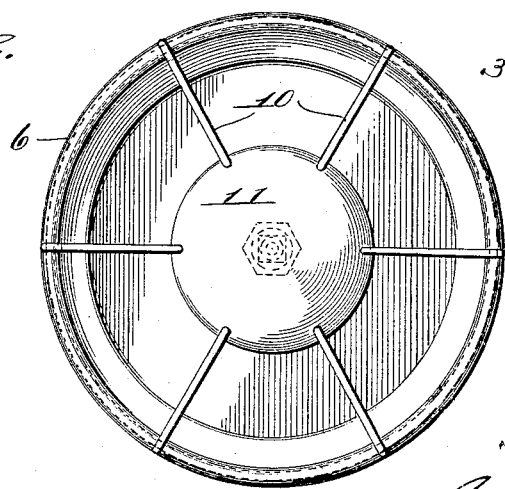
Witnesses
Inventor
Samuel Dyer
By Chas. E. Brock
Attorney S. DYER.
AUTOMATIC DRINKING FOUNTAIN.
APPLICATION FILED MAY 22, 1914.
1,131,046.
Patented Mar. 9, 1915.
2 SHEETS—SHEET 2.
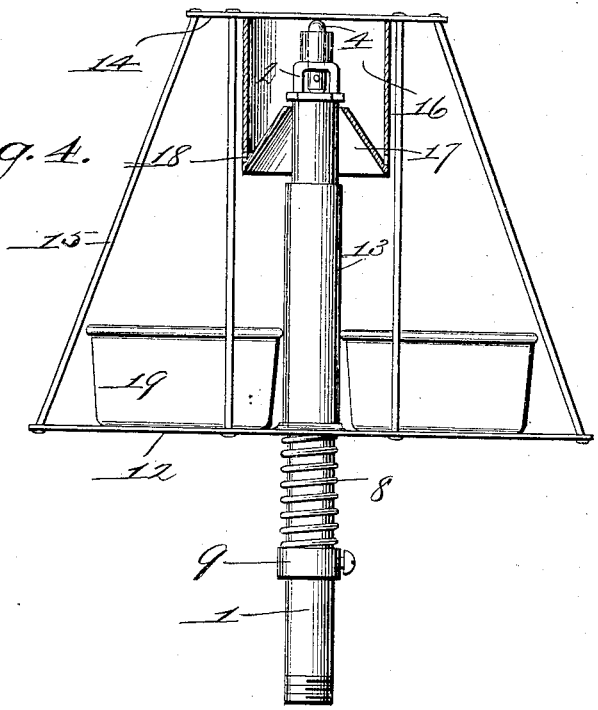
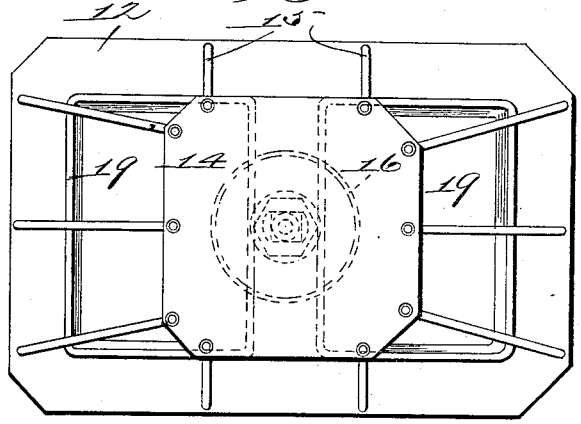

UNITED STATES PATENT OFFICE.

SAMUEL DYER, OF INGLEWOOD, CALIFORNIA.

AUTOMATIC DRINKING-FOUNTAIN.

1,131,046. Specification of Letters Patent. Patented Mar. 9, 1915.

Application filed May 22, 1914. Serial No. 840,270.

*To all whom it may concern:*

Be it known that I, SAMUEL DYER, a citizen of the United States, residing at Inglewood, in the county of Los Angeles and State of California, have invented a new and useful Improvement in Automatic Drinking-Fountains, of which the following is a specification.

This invention relates to an automatic drinking fountain designed especially for use in connection with large poultry plants where there is a source of water power under pressure.

The invention consists of the novel features of construction hereinafter described, pointed out in the claims and shown in the accompanying drawings, in which, Figure 1 is a vertical sectional view. Fig. 2 is a plan view. Fig. 3 is an enlarged detail view of a valve, the valve seat being shown partly in section. Fig. 4 is a side elevation partly in section illustrating a slight modification.

In all of the drawings, 1 represents a supply pipe which is adapted to be connected to a feed pipe leading from a suitable source of water supply, such as city mains, or from an overhead tank or reservoir.

The upper end of the pipe carries a suitable valve cage 2 provided with a seat 3 in which seats a tapering lower end of the loosely mounted cylindrical valve 4. This valve is in the form of a rod and works upwardly through a sleeve 5 carried by the upper portion of the cage 2.

The parts above described are common in both forms of the invention.

In the form illustrated in Figs. 1 and 2 a circular pan 6 is provided with a centrally arranged sleeve 7 open at both ends, so that said pan may be slidably mounted upon the pipe 1. A spring 8 is arranged below the pan and rests upon an adjustable collar 9. Supported centrally above the pan by means of wire rods 10 is an inverted cone 11, the apex of the cone being in vertical alinement but normally out of engagement with the rod valve 4, the pan being supported upon the spring 8. The weight which said spring will sustain in such position is regulated by adjustment of the collar 9. When the water supply is turned on the pressure of the water will lift the valve 4 from its seat, and the stream of water striking within the cone 11 will be deflected and will fall into the pan 6. The weight of this water added to the weight of the pan and cone will compress the spring 8 and when the desired quantity of water has been fed to the pan it will have dropped to such a point that the apex of the cone will engage the upper end of the rod valve and force the lower end into engagement with the seat 3, thereby cutting off the supply.

The collar 9 of course is adjusted according to the pressure under which the water is fed.

In the forms shown in Figs. 4 and 5 the same means of supplying and regulating the flow of water is provided, the only change being in the shape and manner of supporting the drinking vessel. In this form a suitable flat plate or tray is provided with a sleeve 13 which works upon the pipe 1, and a top plate 14 is supported by rods 15, and carries a depending cylinder 16 downwardly open. Within the lower portion of the cylinder is arranged a truncated cone 17 through which the pipe 1 passes, and the valve mechanism previously described rests within the cylinder 16 and above the cone. The cylinder has suitable discharge openings 18 formed adjacent the cone base. Suitable removable drinking pans 19 rest upon the plate 12. By tilting the pans 19 upon edge they can be withdrawn between the rods 15 for purposes of cleaning. In this form of the device when a sufficient amount of water has been fed to the pans a top plate 14 engages the rod valve and forces the same to its seat. When the valve is opened the water is discharged into the cylinder 16 and is spread by the cone 17 being discharged through the openings 18 into the pans. In one case the water is directed upon the inner side of the cone and deflected, and in the other case it falls upon the outer face of the cone and is deflected.

These devices may of course be formed of any desired size and I do not desire to be limited to the use of a coil spring for the purpose of supporting the parts in normal position, nor to any specific construction of the valve 4.

What I claim is:—

1. The combination with a water supply pipe, of a drinking vessel movable vertically and in parallel relation to said pipe, a valve at the upper end of the pipe, a water deflector carried above the plane of the vessel and above said valve, and a spring supporting said vessel, said deflector bearing on and closing the valve on downward movement of the vessel.

2. A device of the kind described comprising a vertically arranged supply pipe, a drinking vessel movable vertically with respect to said pipe, a spring for sustaining said vessel, a valve arranged upon said pipe, and means supported above the top of the vessel and above the pipe for deflecting the water discharged from the pipe into the vessel and also for actuating said valve upon downward movement of the vessel.

3. A device of the kind described comprising a vertically arranged water supply pipe, a valve cage carried at its upper end, a valve adapted to move vertically through said cage and to project thereabove, a drinking vessel movable vertically, yieldable means for normally supporting said vessel, and a deflector supported from said vessel and above said valve cage, said deflector engaging said valve and forcing the same into closed position upon downward movement of the vessel under a predetermined weight of the water.

SAMUEL DYER.

Witnesses:
  Mrs. A. H. Wanless,
  Albert Henry Wanless.

Copies of this patent may be obtained for five cents each, by addressing the "Commissioner of Patents, Washington, D. C."